(12) United States Patent
Winius

(10) Patent No.: US 7,969,034 B2
(45) Date of Patent: Jun. 28, 2011

(54) PADDLE WHEEL ELECTRIC GENERATOR

(76) Inventor: Henry C. Winius, Lakeside, CA (US)

( * ) Notice: Subject to any disclaimer, the term of this patent is extended or adjusted under 35 U.S.C. 154(b) by 543 days.

(21) Appl. No.: 12/215,719

(22) Filed: Jun. 30, 2008

(65) Prior Publication Data

US 2009/0322093 A1    Dec. 31, 2009

(51) Int. Cl.
*F03B 13/00* (2006.01)
*F03B 13/10* (2006.01)

(52) U.S. Cl. .......................... 290/54; 290/43
(58) Field of Classification Search .............. 290/43, 290/53, 54; 415/7, 8
See application file for complete search history.

(56) References Cited

U.S. PATENT DOCUMENTS

| | | | | |
|---|---|---|---|---|
| 1,280,617 A * | 10/1918 | Watkins | ............................ | 415/5 |
| 3,807,890 A * | 4/1974 | Wright | ............................ | 415/3.1 |
| 4,268,757 A * | 5/1981 | Rogers | ............................ | 290/53 |
| 4,352,990 A * | 10/1982 | Aucoin, Jr. | ............................ | 290/54 |
| 4,467,218 A * | 8/1984 | Andruszkiw et al. | ............................ | 290/54 |
| 4,511,808 A * | 4/1985 | Jost | ............................ | 290/54 |
| 4,516,033 A * | 5/1985 | Olson | ............................ | 290/54 |
| 4,636,141 A * | 1/1987 | Sedlacek | ............................ | 416/86 |
| 4,717,832 A * | 1/1988 | Harris | ............................ | 290/43 |
| 4,725,195 A * | 2/1988 | Wiggs | ............................ | 415/7 |
| 4,843,249 A * | 6/1989 | Bussiere | ............................ | 290/53 |
| 5,082,423 A * | 1/1992 | Morgan | ............................ | 416/111 |
| 5,136,174 A * | 8/1992 | Simoni | ............................ | 290/54 |
| 6,499,939 B2 * | 12/2002 | Downing | ............................ | 415/3.1 |
| 7,042,113 B2 * | 5/2006 | Aukon | ............................ | 290/54 |
| 7,125,486 B1 * | 10/2006 | Chuang | ............................ | 210/155 |
| 7,696,633 B2 * | 4/2010 | Zajchowski et al. | ............................ | 290/54 |

* cited by examiner

*Primary Examiner* — Nicholas Ponomarenko
(74) *Attorney, Agent, or Firm* — Theresa M. Seal

(57) ABSTRACT

A minimal maintenance paddle wheel electric generation device for producing no cost electricity includes an A-frame base disposed in a fast flowing stream with a paddle wheel mounted between A-frame supports, with the supports resting on the base, and the paddle wheel including radially arranged dip blades with the rotation of the paddle wheel by the swiftly running water turning a drive gear that engages a series of reduction gears that, in turn, actuate a generator for producing electricity. A pair of paddle wheels can be ganged together on several floating members with the floating members tethered by cables to stanchions fixed on opposed banks of the stream. The paddle wheel can also be supported on buoyant inflatable tubes that have curvilinear members attached to the rear ends for directing water into the channel formed between the tubes thereby enhancing water flow and the angular speed of the paddle wheel for increased power generation.

4 Claims, 4 Drawing Sheets

PADDLE WHEEL ELECTRIC GENERATOR

FIELD OF THE INVENTION

The present invention pertains to hydroelectric generation devices, and more particularly pertains to a fixed or floating paddle wheel electric generation device located in narrow, hard flow watercourses.

BACKGROUND OF THE INVENTION

With energy needs of society growing each year, efforts to obtain the maximum benefit from conventional and alternative sources has intensified in recent years. Technology and capital is being harnessed and allocated to search for new energy sources that range from deep-water oil drilling off the continental shelves to hydrogen fusion and from windmills to natural gas. Hydroelectric power is also being employed as most notably attested to by the Three River Gorges dam in China. However, hydroelectric power generation doesn't have to be limited to locations astride the major rivers of the world. Numerous geographic locales include swiftly running or hard running streams that if properly utilized could provide the power needs—at low cost or no cost—to small villages and towns and to rural areas that may be otherwise hard to service. The hydroelectric power generation devices that would utilize narrow, hard running streams as the source of electric generation would need to be easy to transport and set up, relatively simple in construction and operation, and generally low maintenance. The prior art discloses a number of varied examples wherein waterpower is used in the generation of electricity.

For example, the Watkins patent (U.S. Pat. No. 1,280,617) discloses a water power plant that includes both horizontal and vertical surfaces that convey water to a bucket wheel or paddle for turning the paddle.

The Rogers patent (U.S. Pat. No. 4,268,757) discloses a water wheel electric generation device that includes a platform mounted on fixed pylons with the platform slidable on the pylons as a result of tidal changes, and mounted on the platform are a plurality of radial paddle arms that are interconnected to a gearing arrangement.

The Aucoin Jr. patent (U.S. Pat. No. 4,352,990) discloses a water powered electric generator that includes a pair of pontoons disposed within a stream and held apart by a bottom wall and an endless belt and a row of paddle wheels located between the pontoons for harnessing the water power.

The Jost patent (U.S. Pat. No. 4,511,808) discloses a water wheel installation that includes a plurality of anchored pontoons supporting a plurality of water wheels with the pontoons forming a number of water channels that flow past and turn the water wheels.

The Harris patent (U.S. Pat. No. 4,717,832) discloses a tidal and river turbine that includes a plurality of augurs disposed within the water flow which are interconnected to hydroelectric generators mounted on a topside platform.

The Wiggs patent (U.S. Pat. No. 4,725,195) discloses a piggyback waterpower generator that includes side pontoons that angle water away from the water flowing directly into the paddle wheels, and wheels mounted to the lower end of cone-shaped legs that allow the positioning of the waterpower generator in shallow water.

Nonetheless, despite the ingenuity of the above devices, there remains a need for a paddle wheel electric generation device that is easy to construct and install, generally is maintenance free, and produces low cost or no cost electricity.

SUMMARY OF THE INVENTION

The present invention comprehends a paddle wheel electric generation device for the production of no cost, pollution free electricity by placement of the paddle wheel generation device in a watercourse such as a narrow, hard flow or fast flow stream.

The paddle wheel electric generation device includes a paddle wheel having a plurality of radially spaced dip blades or vanes, with the vanes laterally projecting from the paddle wheel so that at least three blades are always in contact with the flowing water. The paddle wheel is rotatably mounted to the A-frame supports by a main drive shaft. The A-frame supports are mounted upon an A-frame base that fixedly rests upon the bed of the watercourse. Also mounted to the main drive shaft, and concentric with the paddle wheel, is a main drive gear. A series of reduction gears (at least three) are mounted to a gear support plate, with the gear support plate mounted to one of the A-frame supports. The main drive gear drivingly engages one of the reduction gears while another reduction gear engages a generator so that rotatable motion is transmitted from the paddle wheel through the main drive gear for turning the generator. Electrical mains or wires extend from the generator for interconnection to the existing electrical grid system.

The paddle wheel electric generation device includes several mounting methods. In one embodiment the A-frame supports, the paddle wheel, and the gearing and generator are mounted upon an A-frame base that rests upon the bed of the stream. In another embodiment at least two paddle wheels can be ganged together and located on several spaced-apart floating supports that create channels for the flowing water. The floating supports are tethered by cables to stanchions fixed into the banks on both sides of the watercourse. In yet another embodiment one paddle wheel can be placed upon buoyant inflatable tubes with each buoyant tube having a curvilinear member attached to and flaring rearwardly therefrom for channeling water at a higher flow velocity between the tubes and to the paddle wheel. The buoyant tubes also allow the paddle wheel device to easily raise or lower with any changing water levels of the watercourse, and will also allow the movement and repositioning of the paddle wheel device to other locations along the watercourse should that become necessary.

It is an objective of the present invention to provide a paddle wheel electric generation device that can be anchored to the streambed or placed upon a barge and tethered to the banks of the stream.

It is another objective of the present invention to provide a paddle wheel electric generation device that allows for a cost-effective way to utilize any narrow, hard-flow water source for power generation.

It is yet another objective of the present invention to provide a paddle wheel electric generation device that provides pollution free power at minimal cost or no cost.

It is still yet another objective of the present invention to provide a paddle wheel electric generation device wherein several electric generation devices can be ganged together on floating platforms or barges for electricity generation.

Still yet another objective of the present invention is to provide a paddle wheel electric generation device that requires no fuel consumption for its operation and is manufactured from durable, readily available materials.

Still yet a further objective of the present invention is to provide a paddle wheel electric generation device that can be mounted or supported in the watercourse in several different ways in order to take advantage of the particular terrain, topography, and current characteristics of the watercourse.

These and other objects, features, and advantages will become apparent to those skilled in the art upon a perusal of the following detailed description read in conjunction with the accompanying drawings and appended claims.

DETAILED DESCRIPTION OF THE PREFERRED EMBODIMENT

Figure 1:
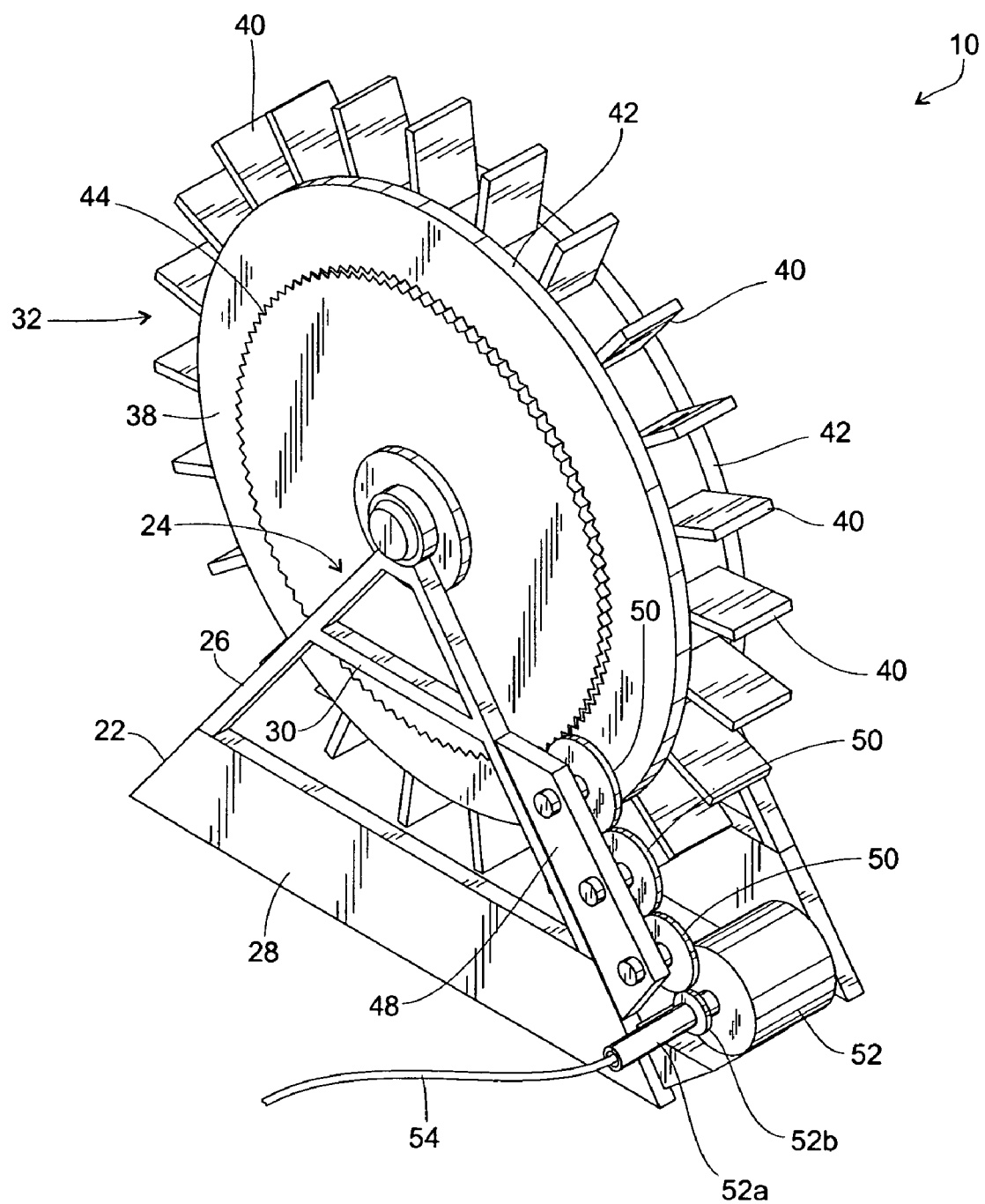
FIG. 1 is a perspective view of the paddle wheel electric generation device of the present invention illustrating the paddle wheel supported on a non-movable A-frame base within a swiftly running stream.
Figure 2:
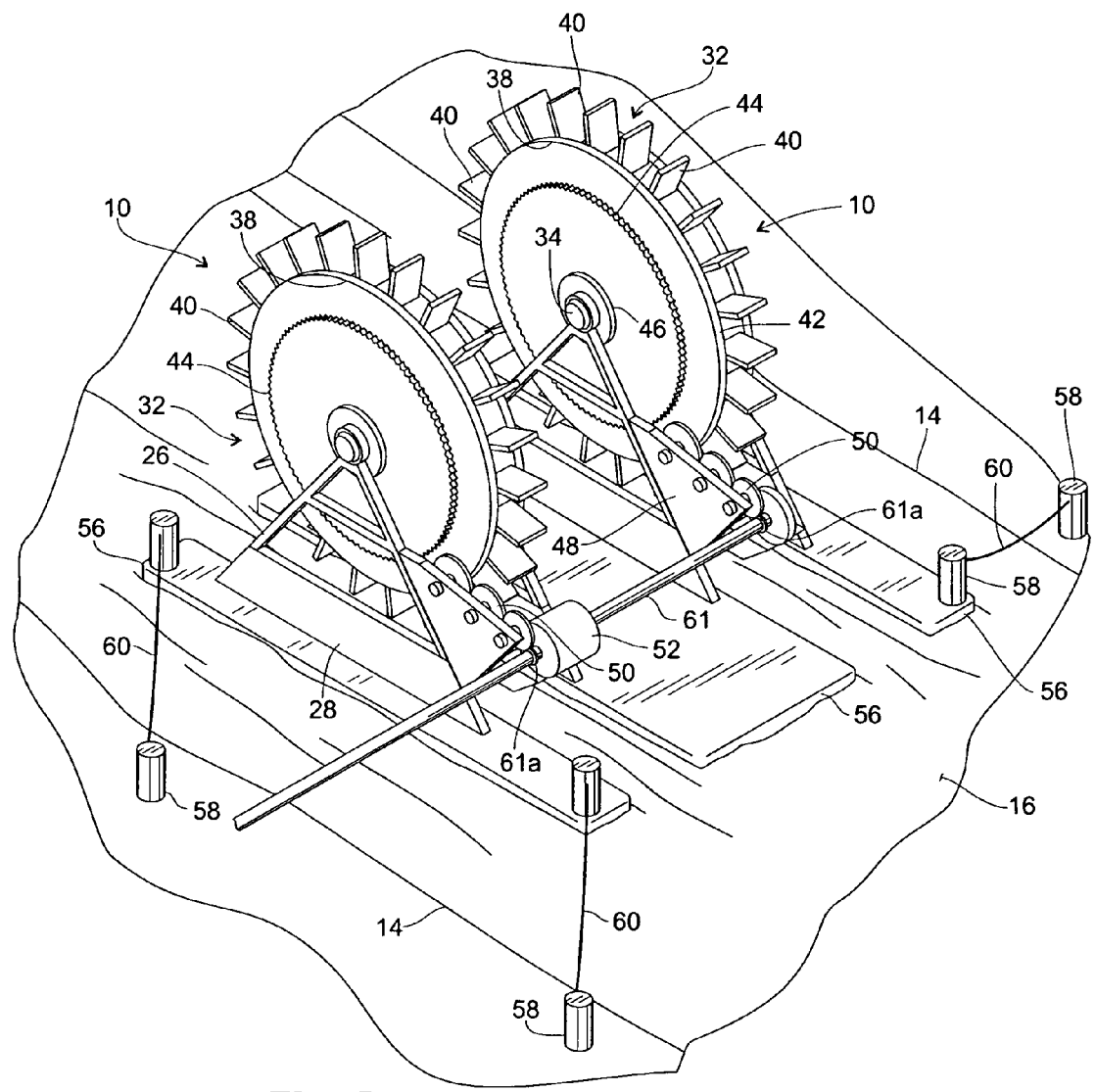
FIG. 2 is a perspective view of the paddle wheel electric generation device of the present invention illustrating the ganging together of two devices that are supported on floating barges with the barges tethered to the bank of the stream by flexible cables connected to stanchions.
Figure 3:
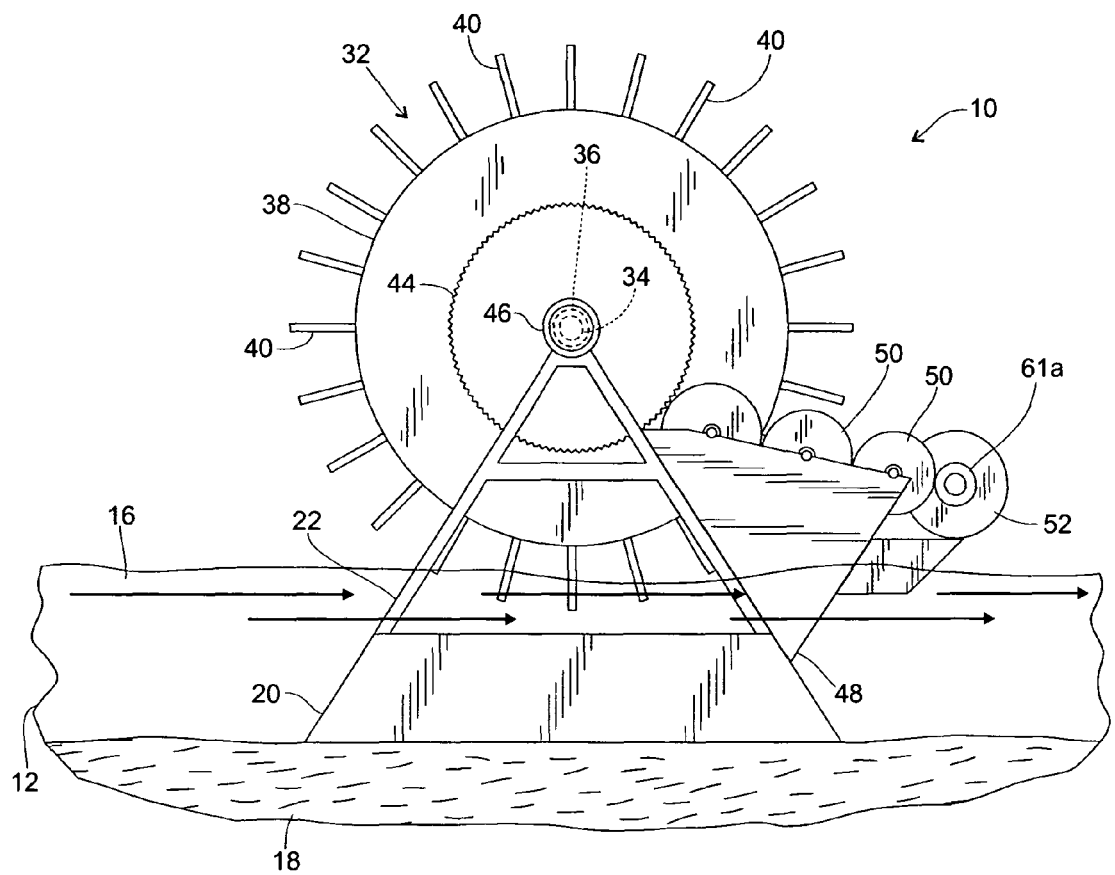
FIG. 3 is a side elevational view of the paddle wheel electric generation device of the present invention.

Illustrated in FIGS. 1-6 is a paddle wheel electric generation device 10 for producing pollution-free electricity at low cost or no cost by utilizing the inherent force of nature as manifested in any appropriate hard running and swift flowing narrow water course such as any swiftly flowing mountain stream especially where there is a descent in the stream that enhances the flow velocity of the stream. Thus, shown in FIGS. 2 and 3 is a representative watercourse 12 such as a narrow, hard-flow stream defined by opposed stream banks 14 and having a stream surface 16 and a streambed or bottom 18.

As shown in FIGS. 1-3, the paddle wheel generation device 10 is disposed in the stream 12 for harnessing the energy of the flowing stream 12 for the generation of electricity. The device 10 includes a mounting means for securing the device 10 to the streambed, and one preferred embodiment for the mounting means is an A-frame base 20 preferably of concrete. The A-frame base 20 is fixedly placed at the bottom of the stream 12 and on the streambed 18. Located on the A-frame base 20, and upwardly projecting therefrom, is a pair of spaced-apart A-frame supports 22. Each A-frame support 22 includes a lower end and an opposite upper end adjacent the apex 24 of each respective support 22. In addition, each A-frame support 22 includes a pair of upwardly converging legs 26, a cross plate 28 and an upper cross bar 30. Mounted in between the A-frame supports 22 is a paddle wheel 32. The paddle wheel 32 is rotatably mounted to the A-frame supports 22 by a main drive shaft 34 that concentrically extends through the paddle wheel 32, and the main drive shaft 34 is mounted to and located at the upper ends of the A-frame supports 22 adjacent their apexes 24. The main drive shaft 34 is journaled to the upper ends of the supports 22 by an interior sealed bearing support 36.

As shown in FIGS. 1-3, and 6, the paddle wheel 32 includes a pair of spaced apart cylindrical support plates 38 that are also concentric to the main drive shaft 34 and mounted in between and to the support plates 38 are a plurality of dip blades or vanes 40. The dip blades or vanes 40 are spaced from each other and are radially arranged about the cylindrical support plates 38. A major portion of each dip blade 40 laterally projects past the peripheral edge 42 of each support plate 38 thereby assuring their continual contact with the flowing stream 12 and the continual rotation of the paddle wheel 32 by the stream 12. The spacing of the dip blades 40 is such that at least three dip blades 40 are always in contact with the flowing stream 12 assuring the continuous rotation of the paddle wheel 32. Mounted to the exterior of one cylindrical support plate 38, and contiguous thereto, is a circular main drive gear 44. The main drive gear 44 is also concentrically mounted to the main drive shaft 34. The main drive gear 44 rotates concomitant with the rotation of the main drive shaft 34 as a result of the hard flow stream 12 continually turning the dip blades 40 of the paddle wheel 32. A cylindrical shaft cap 46 is mounted on the main drive shaft 34 and maintains the position of the main drive gear 44 contiguous to the cylindrical support plate 38 and prevents any axial movement of the main drive gear 44 on the main drive shaft 34.

As illustrated in FIGS. 1-3, a gear support 48 is mounted to one leg 26 of one A-frame support 22. The gear support 48 rotatably supports thereon a plurality of reduction gears 50 with three reduction gears 50 being the preferred number for the device 10 of the present invention. The main drive gear 44 drivingly engages one reduction gear 50 and the engagement of this reduction gear 50 transmits rotatable motion to the other two reduction gears 50. Mounted upon the A-frame base 20 is a generator 52 that is interconnected to and in driving engagement with the reduction gears 50, with the rotation of elements (not shown and conventional in the field) within the generator 52 resulting in the generation of pollution-free, low cost or no cost electricity. More specifically, the generator 52 is supported on a main drive shaft 52a and rotates concomitant with the rotation of the main drive shaft 52a. Also mounted on the main drive shaft 52a is a drive shaft gear 52b. The adjacent reduction gear 50 drivingly engages the drive shaft gear 52b, and this causes the rotation of the main drive shaft 52a and the generator 52 mounted thereon for inducing electric current and generating electricity for distribution to the electrical grid. An electrical main or cable 54 extends outwardly through the main drive shaft 52a and from the generator 52 for interconnection to the existing electrical grid system in the region or locale for which the paddle wheel generation device 10 has been set up so that electricity is continuously supplied to the grid system.

Illustrated in FIG. 2 is an alternative means for supporting and mounting the paddle wheel device 10 in the stream 12, and more specifically ganging together two paddle wheel electric generation devices 10 in the stream 12. Thus, shown in FIG. 2 are two paddle wheel devices 10 supported on three floating barges 56 that are spaced from each other across the width of the stream 12. The spacing of the barges 56 creates channels that enhance the flow of water flowing therebetween, and thus the paddle wheels 32 turn with greater rapidity because of the increased flow velocity of the water. Fixed on both stream banks 14 are posts or stanchions 58, and the floating barges 56 are tethered to the stanchions 58 by flexible cables 60. The flexible cables 60 allow the floating barges 56 some slack to accommodate changing stream levels and changing stream currents. The paddle wheels 10 are interconnected by an auxiliary drive shaft 61 that, in turn, connects to the generator 52 for one of the paddle wheels 10. In addition, as shown in FIGS. 2 and 3, a pair of drive shaft gears 61a is mounted on auxiliary shaft 61 and rotate concomitant therewith. Each drive shaft gear 61a is drivingly engaged by an adjacent reduction gear 50 thereby causing the rotation of the shaft 61 and the generator 52 for inducing electric current and producing electricity for distribution to the electrical grid system.

Figure 4:
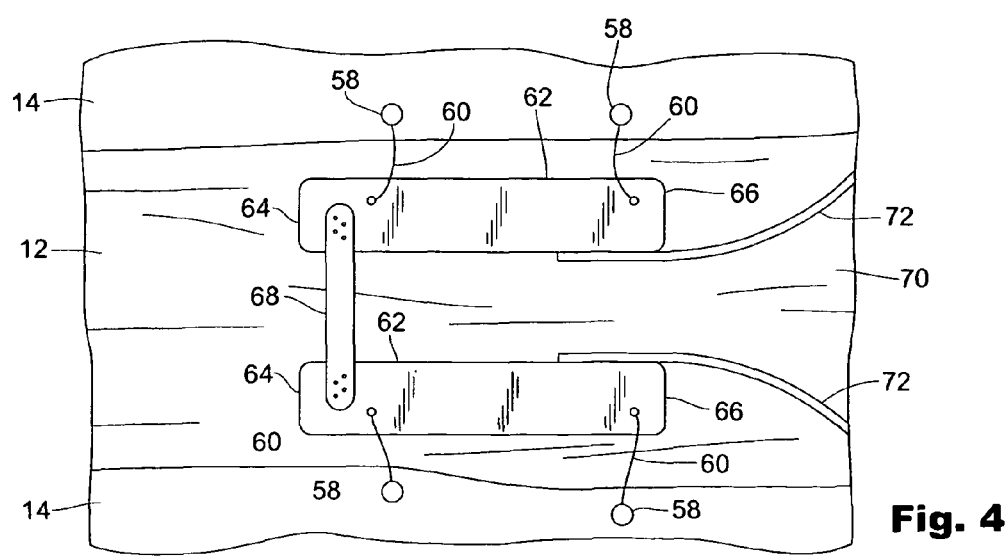
FIG. 4 is a top plan view of the paddle wheel electric generation device of the present invention illustrating an alternative support or mounting means for the device in the form of buoyant, inflatable tubular members.
Figure 5:
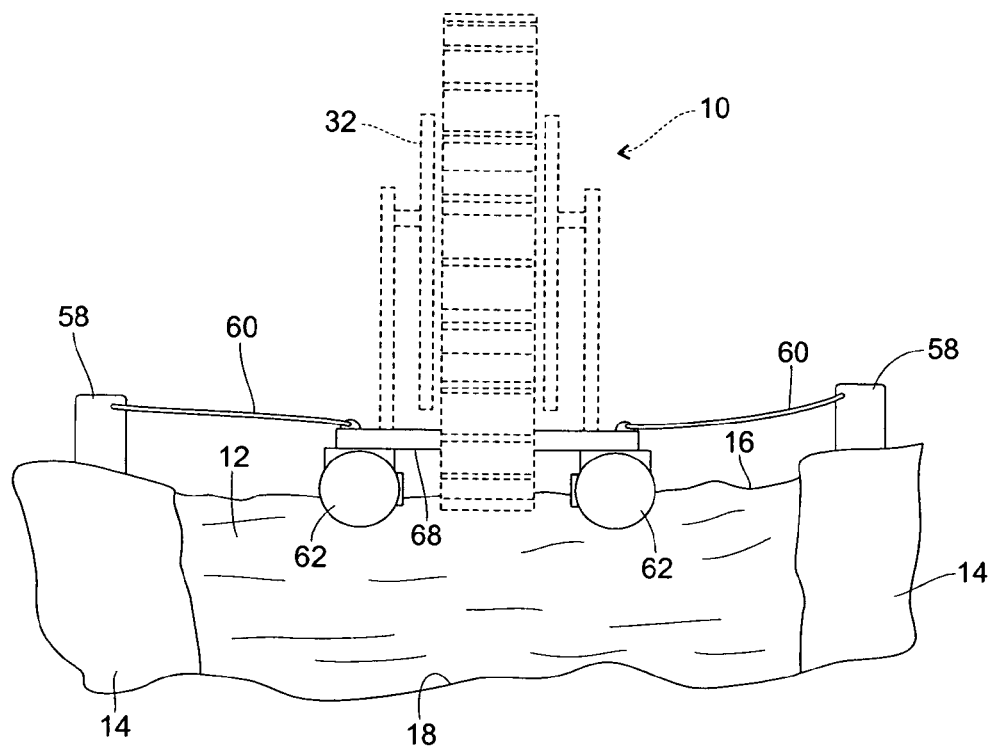
FIG. 5 is a front elevational view of the paddle wheel electric generation device of the present invention illustrating the alternative embodiment of the inflatable buoyant tubular members shown in FIG. 4 to support the device in the stream.
Figure 6:
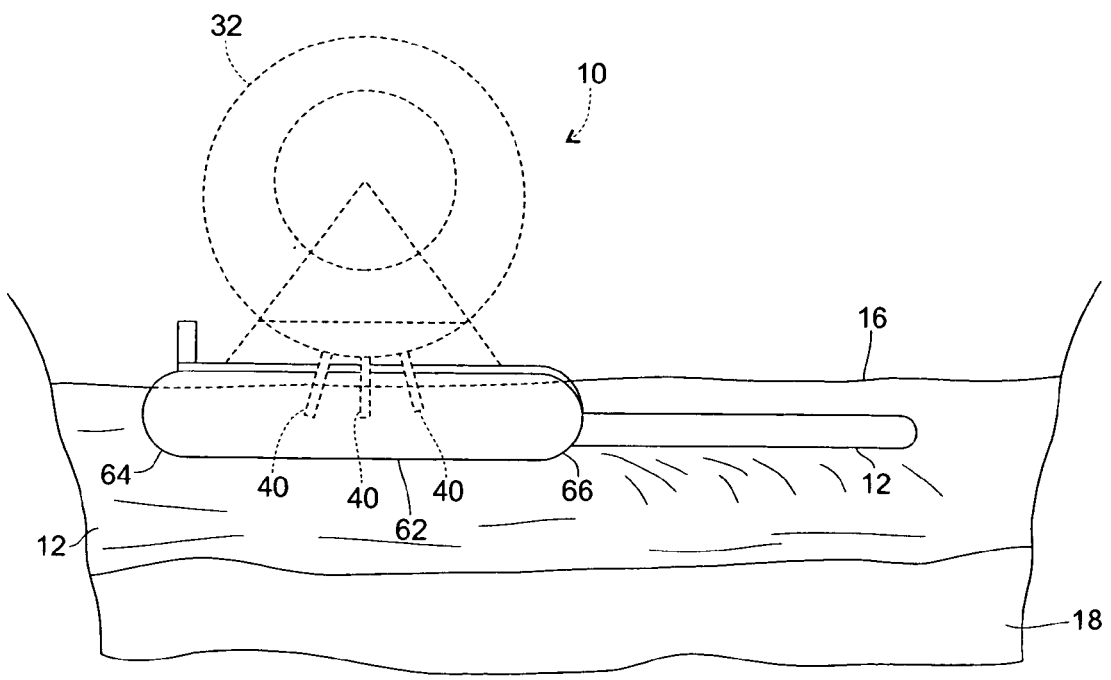
FIG. 6 is a side elevational view of the paddle wheel electric generation device of the present invention illustrating the use of the inflatable buoyant tubes first shown in FIG. 4 to support the device in the stream.

Illustrated in FIGS. 4-6 is another alternative embodiment for the mounting or supporting means for the paddle wheel generation device 10. The embodiment of FIGS. 4-6 includes a pair of buoyant inflatable tubes or tubular members 62 each having a front end 64 and a rear end 66. A transverse connection plate 68 extends between and joins the tubular members 62 at their respective front ends 64. The spacing of the tubular members 62 creates a longitudinal channel 70 that increases the velocity of the flow of water therebetween. One A-frame support 22 is mounted on one tubular member 62 and the other A-frame support 22 is mounted on the other tubular member 62. In addition, located at the rear end 66 of each tubular member 62 is a curvilinear member 72. The curvilinear members 62 cooperate to channel a portion of the flowing water between the curvilinear members 72 and thence between the tubular members 62. The curvilinear members 72 flare outwardly from the rear ends 66 of the tubular members 62 so that as a portion or volume of water flows between the curvilinear members 72 and thence between the tubular members 62 the water's flow velocity increases (by known physical principles) thereby striking the dip blades 40 with greater force and resulting in and increase in the angular velocity of the paddle wheel 32. The increased rotation (angular velocity) is then transmitted through the main drive gear 44 and the reduction gears 50 to the generator 52 resulting in greater power generation by the paddle wheel device 10. The paddle wheel device 10 using the tubular members 62 can be flexibly connected to the bank 14 using the cables 60 and posts 62 shown in FIG. 2. One advantage of the tubular members 62 is that they can be easily moved and positioned at different locations along the watercourse 12 to accommodate changes and variations in the level and flow velocity of the watercourse 12 for maintaining the desired amount of electricity generation by the paddle wheel device 10.

This invention is not to be construed as limited to the particular forms disclosed herein, since these are to be regarded as illustrative rather than restrictive. It is, therefore, to be understood that the invention may be practiced within the scope of the claims otherwise than as specifically described.

I claim:

1. A paddle wheel electric generation device for disposition in a hard flow stream having a stream bed and opposed banks for producing electricity, comprising:
    an A-frame base for placement upon the streambed;
    a pair of opposed A-frame supports mounted upon the A-frame base and upwardly projecting therefrom;
    a main drive shaft extending between and mounted to the A-frame supports;
    a paddle wheel concentrically mounted to the main drive shaft for rotation thereon;
    a main drive gear coaxially mounted to the paddle wheel and the main drive shaft for concomitant rotation with the main drive shaft;
    a plurality of dip blades mounted to the paddle wheel and radially arranged thereon;
    the dip blades projecting from the paddle wheel so that at least three dip blades are always in continuous contact with the hard flow stream;
    a gear support mounted to one of the A-frame supports;
    a plurality of reduction gears mounted to the gear support and drivingly interconnected to each other with one reduction gear drivingly engaged by the main drive gear; and
    a generator interconnected to the reduction gears whereupon the rotation of the paddle wheel by the hard flow stream rotates the main drive shaft and the main drive gear thereupon rotating the reduction gears resulting in the actuation of the generator for the production of electricity.

2. The paddle wheel electric generation device of claim 1 further comprising a plurality of floating barges for supporting thereon the A-frame supports and the paddle wheel.

3. The paddle wheel electric generation device of claim 2 further comprising a pair of buoyant inflatable tubular members for disposition upon the hard flow stream and upon which the A-frame supports and the paddle wheel are mounted.

4. A paddle wheel electric generation device for disposition in a hard flow stream having a stream bed and opposed stream banks for producing electricity, comprising:
    a supporting means for disposition in the hard flow stream;
    a pair of opposed A-frame supports mounted upon the supporting means and upwardly projecting therefrom;
    a main drive shaft extending between and mounted to the A-frame supports;
    a paddle wheel concentrically mounted to the main drive shaft for concomitant rotation with the main drive shaft;
    a main drive gear coaxially mounted to the main drive shaft and paddle wheel for concomitant rotation with the main shaft gear and paddle wheel;
    a plurality of dip blades mounted to the paddle wheel and radially arranged thereon;
    the dip blades projecting from the paddle wheel so that at least three dip blades are always in continuous contact with the hard flow stream;
    a gear support mounted to one of the A-frame supports;
    a plurality of reduction gears mounted to the gear support and drivingly interconnected to each other with one reduction gear drivingly engaged by the main drive gear; and
    a generator interconnected to the reduction gears whereupon the rotation of the dip blades by the hard flow stream rotates the paddle wheel and the main drive shaft and the main drive gear thereupon causing the rotation of the reduction gears resulting in the actuation of the generator for the production of electricity.

* * * * *